April 14, 1970        J. V. DEJOUX        3,506,343
METHOD AND APPARATUS FOR MAKING ANIMATED CARTOONS
Filed July 12, 1967
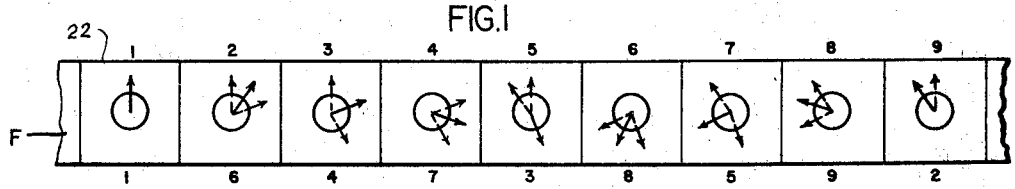
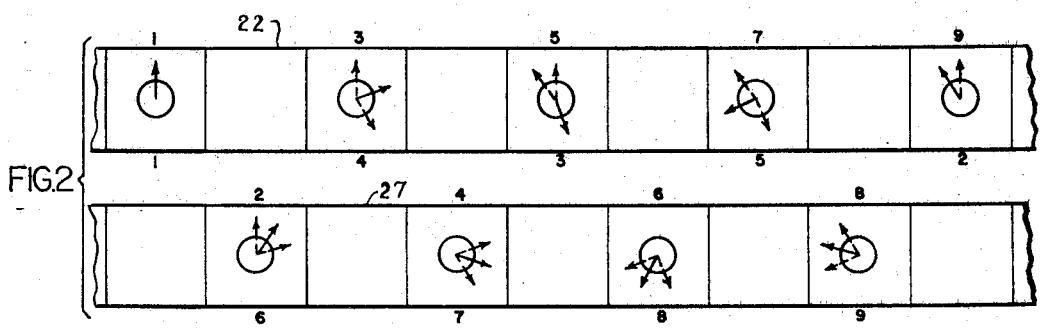
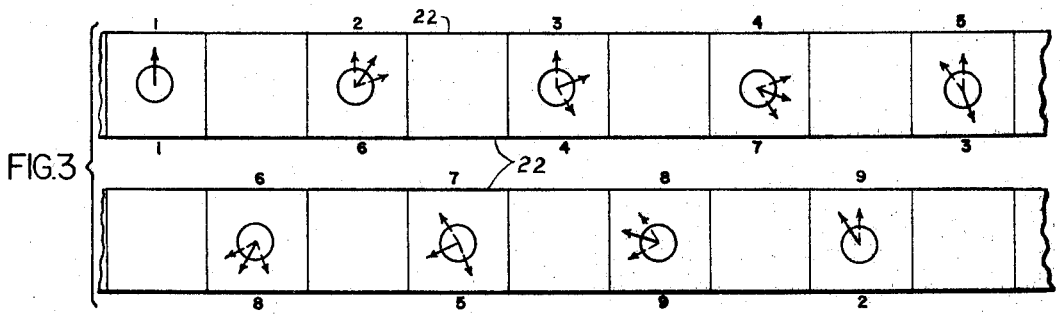
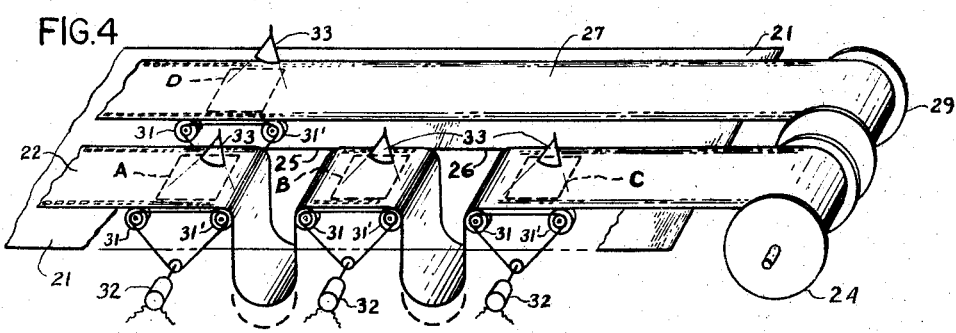
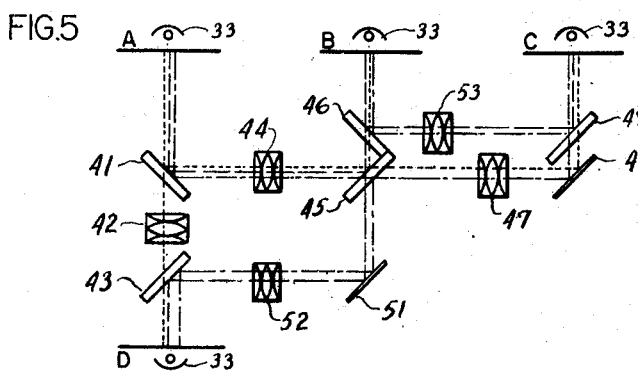
INVENTOR.
JEAN VÉRAN DEJOUX
BY
ATTORNEYS

United States Patent Office 3,506,343
Patented Apr. 14, 1970

3,506,343
METHOD AND APPARATUS FOR MAKING ANIMATED CARTOONS
Jean Veran Dejoux, Paris, France, assignor, by mesne assignments, to Optical Systems Corporation, New York, N.Y., a corporation of Delaware
Filed July 12, 1967, Ser. No. 652,903
Int. Cl. G03b *19/18, 21/32*
U.S. Cl. 352—50  12 Claims

ABSTRACT OF THE DISCLOSURE

A method and apparatus for making animated cartoons in which the images of two pictures of a sequence may be projected in superposed relation at one or more of a plurality of drawing surfaces where a third picture, derived from the superposed projected images, may be drawn. The pictures are drawn on one or more film strips of suitable drawing material which are mounted for movement across said drawing surfaces. The portion of any strip located at any drawing surface may be moved forwardly or backwardly with respect to that surface independently of other portions of the strips located at any other drawing surface.

---

In U.S. Patent No. 3,271,097 in which I am co-inventor with Jeam de Montremy, there is described a method and apparatus for making animated cartoons in which two separate film strips are mounted to be fed step by step over the surfaces of two separate frosted glass windows constituting drawing stations where an artist may draw pictures. Provision is made for projecting the image of a picture drawn in the frame of a film strip which is located over either of said windows onto a frame of the film strip which is located over the other of said windows. The projecting system comprises suitable lenses and prisms to project the said images erect, unreversed, and in the same size as the original pictures. Thereby, after a first picture has been drawn at one window, it becomes possible for the artist to derive a second picture from the projected image of the first by projecting it onto a frame at the other window where the second picture is to be drawn. Thereafter, after advancing the first film strip to bring another frame over the first window, it is possible to project the image of the second picture onto that frame, so that the artist may then derive a third picture from the projected picture of the second, and so on.

The method as above described is quite satisfactory to an artist accustomed to drawing animated cartoon pictures in the sequence in which they are to be projected. Many artists, however, prefer to draw pictures in a sequence which is different from that in which they are to be projected. For example, the artist may prefer to draw the first picture of a sequence consisting of a given number of pictures, and then to draw the last picture of the sequence. Then he may wish to draw the intermediate pictures in any one of several different sequences.

It is an object of the present invention to provide a method and apparatus for making animated cartoons, according to which it is possible for the artist to draw pictures in any sequence of his choice, and according to which it is possible for him to project the image of a picture which has been drawn, or the composite, superposed images of a pair of pictures which have been drawn, at any station where it may be desired to draw the next picture, so that the projected image or images may serve as a guide from which the next picture may be derived.

Other object and advantages of the invention will appear hereinafter.

A preferred embodiment of the invention selected for purposes of illustration is shown in the accompanying drawings, in which, FIGURE 1 is a diagrammatic illustration of a film strip prepared according to the method of the invention.
FIGURE 2 is a diagrammatic illustration of the method as applied to films for making two-strip cartoons.
FIGURE 3 is a diagrammatic illustration of the method as applied to films for making single strip cartoons.
FIGURE 4 is a semi-diagrammatic illustration of the apparatus, shown in perspective.
FIGURE 5 is a diagrammatic illustration of the optical portions of the apparatus.

The method of the invention will be described with reference to the film strip shown in FIG. 1 of the drawings which illustrates diagrammatically a specific example of the use of the method of the invention. In FIG. 1, the film strip F of any suitable drawing material, preferably transparent or translucent, is assumed to be divided into frames, and the frames are numbered in the sequence indicated by the numerals above the strip which represents the sequence in which the pictures are to be projected. As shown in FIG. 1, it is assumed that the sequence is to depict a circle which is to remain stationary, and an arrow which is to rotate in clockwise direction at a rate such that it will make one complete revolution in ten frames of the film strip. That is, the arrow which is depicted in frame 1 in a vertical position will be restored to vertical position at frame 10. Thus, there will be nine different positions of the arrow, and nine pictures to be drawn.

The artist may then proceed as follows. First, he draws the circle and arrow in frame 1. Then he projects the image of the circle and arrow as drawn in frame 1 onto frame 9. Then the artist draws a circle in frame 9, traced from image of the circle projected thereon, and he draws an arrow spaced from the image of the arrow (shown in dotted lines) by the desired distance to complete the second picture.

Next, he projects the image of the circle and arrow as drawn in frame 1 and the image of the circle and arrow as drawn in frame 9 in superposed relation as a composite image onto an intermediate frame, and preferably onto the intermediate frame which is equidistant from the two frames from which the composite image is projected. In the example illustrated in FIG. 1, this would be frame 5, and as shown in FIG. 1, the image of the arrow in the position of frame 1 is represented in frame 5 by a dotted arrow, and the image of the arrow in the position of frame 9 is represented by another dotted arrow. The artist again traces the image of the circle, and he then draws an arrow in an intermediate position halfway between the two arrow images to complete picture 3.

The sequence in which the pictures are drawn in the example of FIG. 1 is indicated by the numerals below the strip. In the following description, the numbers which indicate the sequence in which pictures are drawn will be referred to as picture numbers, and the numbers which indicate the sequence in which the picturse are projected will be referred to as frame numbers. Thus, the numerals below the strip in FIG. 1 are picture numbers.

Picture 3 has now been drawn in frame 5, and picture 4 may next be drawn in frame 3, following the procedures previously described. That is, the images of pictures 1 and 3 would be projected in superposed relation as a composite image onto frame 3 and the circle and arrow would be drawn in positions derived from the composite image projected thereon.

Similarly, picture 5 may be drawn in frame 7 as derived from the composite projected image of pictures 3 and 4, picture 6 may be drawn in frame 2 as derived from the composite projected image of pictures 1 and 4, picture 7 may be drawn in frame 4 as derived from the composite image of pictures 4 and 3, and so on until the nine pictures have been completed. Then a new sequence may be started.

A preferred form of apparatus for carrying out the method of the invention is shown in FIGS. 4 and 5 of the drawings.

In the film strip illustrated in FIG. 1, the pictures have been drawn in consecutive frames. In the use of the apparatus hereinafter described, however, it is desirable to leave a blank frame between each pair of frames in which pictures are drawn. In such cases only the frames in which pictures are drawn are numbered.

As shown in FIGS. 4 and 5, the apparatus comprises a drawing table 21 having a series of apertures therein covered by frosted glass windows A, B, C and D, the surfaces of which are preferably flush with the surface of the table and constitute drawing stations at which the artist may draw pictures on the film strips extending across the windows. Windows A, B and C are arranged in a row, while window D is offset therefrom.

The said apparatus may be employed to draw pictures on two separate film strips with the odd numbered pictures of the sequence on one strip and the even numbered pictures of the sequence on the other strip for projection in the manner described in the aforesaid U.S. Patent No. 3,271,097. However, the said apparatus may also be employed to draw pictures on a single film strip as hereinafter described.

When using the apparatus with two film strips, a first film strip 22 carried on a supply reel (not shown) extends across the windows A, B and C to a take up reel 24. Between the windows A and B, and again between the windows B and C, the table 21 is cut away to provide slots or apertures 25 and 26 to receive loops of the film strip 22 as hereinafter described.

A second film strip 27 carried on a supply reel (not shown) extends across the window D to a take up reel 29.

When using the apparatus with two film strips, as shown in FIG. 2, the odd numbered pictures of the sequence will be drawn on the first film strip 22, using one of the windows A, B and C as a drawing surface, while the even numbered pictures of the sequence will be drawn on the second film strip 27, using the window D as a drawing surface.

Mounted below the table 21 adjacent each of the windows A, B, C and D are pairs of sprockets 31, 31' having sprocket teeth positioned to engage sprocket holes in the film strips 22 and 27 to feed the film strips as desired. Each pair of sprockets is driven independently by a separate motor 32. The motors are reversible so that the portion of the film strip at each window may be moved forwardly or backwardly as desired under the control of the artist, independently of movement of the film strip at any other window.

The length of the loops of the film strip 22 between windows A and B and C will depend on the preference of the artist, it being understood, however, that in using the apparatus of FIGS. 4 and 5, the drawings on each film strip will preferably be drawn in frames which are separated by a blank frame. That is, as illustrated in FIG. 2, each of the odd numbered pictures of strip 22 is spaced from the next odd numbered picture by a blank frame. Likewise, each of the even numbered picture of strip 27 is spaced from the next even numbered picture by a blank frame. This is because, for structural reasons, it is advisable to separate the windows by one frame length to make room for the loops. Consequently, in the example previously referred to in which the artist may wish to draw picture 1 and then to draw picture 9 of the sequence, picture 1 would be drawn at window A and picture 9 would be drawn at window C. There would then be seven frames between window A and window C, three of which are to receive pictures 3, 4 and 5 and four of which are to be left blank. Assuming that picture 3 is to be drawn at window B, the loop between windows A and B would contain three frames and the loop between windows B and C would contain three frames. On the other hand, if picture 5 is to be drawn at window B, the loop between windows A and B would contain five frames and there would be no loop between windows B and C.

In order to project the image of a picture which has been drawn at one window at one or more of the other windows, means are provided for directing a beam of light through each of the windows A, B, C and D from sources of light preferably located above the table 21 so that the light beams emanating therefrom may be directed toward the particular windows carrying the pictures which are to be projected. At least, two sources of light should be provided, each of which may be mounted to be moved to illuminate two windows. In the accompanying drawings, however, a separate lamp 33 is provided to illuminate each of the windows, which said lamps are provided with switches or other controls to enable the artist to selectively direct a light beam toward the window or windows carrying the picture or pictures to be projected.

Mounted below the table 21 in position to intercept the light beams passing through the windows A, B, C and D are a plurality of optical devices comprising split-beam mirrors, mirrors and objective lenses or lens systems. The split beam mirrors and mirrors serve to split the intercepted beam into two or more beams which are then directed toward other windows where the projected images carried by said beams are focused. It will be understood that the term split-beam mirror, as used herein, means a mirror which is semi-transparent and semi-reflective and is sometimes referred to as a beam splitter. If desired, prisms may be substituted for the said split-beam mirrors as is well known in the art.

Thus, referring to FIG. 5, a split-beam mirror 41 is located beneath the window A in position to intercept a light beam passing through the window, the path of the beam and its split portions being indicated by dotted lines. As shown in FIG. 5, the portion of the beam which passes through split-beam mirror 41 then passes through an objective lens system 42, then through the split-beam mirror 43, after which the image carried by the beam is focused on the window D.

At the same time, the portion of the beam which is reflected by the split-beam mirror 41 passes through an objective lens system 44, after which a portion of it is reflected upwardly by the split-beam mirror 45. A portion of the beam then passes through the split-beam mirror 46 so that the image carried by the beam is focused on the window B.

Meanwhile, the portion of the beam which passes through the split-beam mirror 45 passes through an objective lens system 47 and is reflected upwardly by mirror 48. A portion of the beam then passes through the split-beam mirror 49 so that the image carried by the beam is focused on the window C.

Thus, it will be seen that a picture drawn on film strip 22 at window A may be projected to cause its image to appear at each of the windows B, C and D.

Likewise, a picture drawn on film strip 22 at window B may be projected to cause its image to appear at each of the windows A, C and D. The path of the beam which passes through window B is indicated by dash lines.

As shown in FIG. 5, a portion of the beam passes through the split-beam mirror 46 and is reflected by split-beam mirror 45 to pass through objective lens system 44. Thereafter a portion of the beam is reflected upwardly by split-beam mirror 41 so that the image carried by the beam is focused at window A.

At the same time, the portion of the beam which passes through split-beam mirror 45 is reflected by mirror 51 to pass through objective lens system 52, after which a portion of the beam is reflected by split-beam mirror 43 so that the image carried by the beam is focused at window D.

Meanwhile, the portion of the beam which is reflected by the split-beam mirror 46 passes through an objective lens system 53, after which a portion of the beam is reflected upwardly by split beam mirror 49, so that the image carried by the beam is focused at window C.

Again, a picture drawn on film strip 22 at window C may be projected to cause its image to appear at each of the windows A, B and D. The path of the beam which passes through window C is indicated by dot-dash lines.

Finally, a picture drawn on film strip 27 at window D may be projected to cause its image to appear at each of the windows A, B and C. The path of the beam which passes through the window D will be the same as that indicated by the dotted lines in the case of projection through window A, but in the reverse direction.

Thus, it is possible for the artist to project the image of a picture drawn at any window at any other window. It is also possible to project the images of two pictures drawn at any two windows in superposed relation at any other window. Therefore, since the film strips may be moved forwardly or backwardly at any window, the artist has a high degree of flexibility and virtually unlimited choice in the selection and projection of the image or images from which it is desired to derive the next picture to be drawn.

As a specific example of the use of the apparatus according to the method of the invention to draw a sequence of nine pictures on two separate film strips as shown in FIG. 2, the artist could proceed as follows.

First, he would draw picture 1 in frame 1 of the film strip 22 at window A. Then, since he should leave a blank frame between each pair of frames in which pictures are to be drawn, he moves frame 9 of the film strip to window C. He then projects the image of picture 1 onto frame 9 as a guide for drawing picture 2. He then moves frame 5 of the film strip to window B, projects the superposed images of pictures 1 and 2 onto frame 5, and draws the picture 3 therein. He then moves frame 5, carrying the picture 3, to window C, and moves frame 3 of the film strip to window B. He then projects the superposed images of the pictures 1 and 3 onto frame 3 and draws the picture 4 therein.

He then moves frame 5, carrying picture 3, to window A, frame 9, carrying picture 2, to window C, and frame 7 to window B. He then projects the superposed images of the third and second pictures onto frame 7 and draws picture 5 therein.

It will be noted that all of the pictures drawn so far are odd numbered pictures drawn in odd numbered frames, and will constitute the odd numbered frames of the final sequence. It is now necessary to draw pictures for the even numbered frames on film strip 27 at window D.

For this purpose, the artist now moves frame 1 of film strip 22, carrying picture 1 to window A, and moves frame 3, carrying picture 4 to window B. He then projects the superposed images of the first and fourth pictures onto frame 2 of strip 27 and draws picture 6 therein.

Then leaving frame 3, carrying picture 4, at window B, he moves frame 5 of film strip 22, carrying picture 3, to window C. He then moves frame 4 of strip 27 to window D. He then projects the superposed images of pictures 4 and 3 onto frame 4 and draws picture 7 therein.

Then he moves frame 5 of strip 22, carrying picture 3, to window A, and he moves frame 7 of strip 22, carrying picture 5, to window B. He then moves frame 6 of strip 27 to window D. He then projects the superposed images of pictures 3 and 5 onto frame 6 and draws the eighth picture therein.

Then he moves frame 7 of strip 22, carrying picture 5, to window B, and he moves frame 9 of strip 22, carrying picture 2, to window C. He then moves frame 8 of strip 27 to window D. He then projects the superposed images of pictures 5 and 2 onto frame 8 and draws picture 9 therein. Now, having completed the drawing of the nine pictures of the sequence, the artist may now proceed in the same fashion to draw the pictures of another sequence.

Alternatively, if it is desired to draw all of the pictures of a sequence on a single film strip, only the strip 22 would be used. A specific example of the use of the apparatus according to the method of the invention to draw a sequence of nine pictures on a single film strip is shown in FIG. 3. Again, it is desirable to leave a blank frame between each pair of frames in which pictures are to be drawn. In drawing pictures 1, 2, 3, 4 and 5, the procedures previously described would be followed, and these pictures would be drawn in frames 1, 9, 5, 3 and 7, respectively, as before, it being understood that the blank frames are not numbered. Then pictures 6, 7, 8 and 9 will be drawn in frames 2, 4, 6 and 8, respectively.

Thus, when it is desired to draw picture 6, which is to be drawn in frame 2, the artist moves frame 1, carrying the first picture, to window A, frame 3, carrying picture 4, to window C, and frame 2 to window B. He then projects the superposed images of pictures 1 and 4 onto frame 2 and draws picture 6 therein.

Then, to draw picture 7, he moves frame 3, carrying picture 4 to window A, frame 5 carrying picture 3 to window C, and frame 4 to window B. He then projects the superposed images of pictures 4 and 3 onto frame 4 and draws picture 7 therein.

Then, to draw picture 8, he moves frame 5, carrying picture 3, to window A, frame 7, carrying picture 5, to window C, and frame 6 to window B. He then projects the superposed images of pictures 3 and 5 onto frame 6 and draws picture 8 therein.

Finally, to draw picture 9, he moves frame 7, carrying picture 5, to window A, frame 9, carrying picture 2, to window C, and frame 8 to window B. He then projects the superposed images of pictures 5 and 2 onto frame 8 and draws picture 9 therein.

The foregoing sequences of drawing pictures, i.e. the picture numbers in relation to the frame numbers for both two-strip and single strip systems are shown in columns 1 and 2 of the following table. Column 3 shows the image or pair of images from which the respective pictures are derived. Column 4 shows the windows at which pictures may be drawn for the two-strip system, and column 5 shows the windows at which pictures may be drawn for the single strip system.

TABLE

| Frame Numbers | Picture Numbers | Derived From Picture Number | Window (Two-Strip) | Drawn At Window (Single Strip) |
| --- | --- | --- | --- | --- |
| 1 | 1 |  | A | A |
| 2 | 6 | 1+4 | D | B |
| 3 | 4 | 1+3 | B | B |
| 4 | 7 | 4+3 | D | B |
| 5 | 3 | 1+2 | B | B |
| 6 | 8 | 3+5 | D | B |
| 7 | 5 | 3+2 | B | B |
| 8 | 9 | 5+2 | D | B |
| 9 | 2 | 1 | C | C |

It will be understood that the invention may be variously modified and embodied within the scope of the subjoined claims.

I claim as my invention:

1. The method of making animated cartoons which comprises drawing a first picture of a sequence of pictures, drawing a second picture which is to constitute the last picture of the sequence, projecting the images of said first and second pictures in superposed relation as a composite image onto a drawing surface, and drawing a third picture in superposed relation to said composite image as projected onto said drawing surface while said composite image is projected thereon.

2. The method of making animated cartoons in which pictures are drawn in frames of a film strip, which comprises projecting the images of two pictures which have been drawn in frames of said film strip which are spaced apart by intermediate frames in superposed relation as a composite image onto one of said intermediate frames, and drawing a picture in said intermediate frame while said composite image is projected thereon.

3. The method claimed in claim 2 in which the intermediate frame in which said picture is drawn is equidistant from the two frames from which said composite image has been projected.

4. The method of making animated cartoons which comprises drawing a first picture of a sequence of pictures in a frame of a film strip, drawing a second picture which is to constitute the last picture of the sequence in a frame of the said film strip which is spaced by at least one frame from the frame in which said first picture is drawn, projecting the images of said first and second pictures in superposed relation as a composite image onto a frame of said film strip which is located between the frame on which said first and second pictures are drawn, and drawing a third picture in said last named frame while said composite image is projected thereon.

5. The method claimed in claim 4 in which the frame in which said third picture is drawn is equidistant from the two frames from which the said composite image has been projected.

6. Apparatus for making animated cartoons comprising, a drawing table, at least three windows in said table aligned in a row, means for mounting a film strip to extend across all of the windows in the row, means for projecting the image of a picture drawn on said film strip at one of said windows onto the film strip at at least two of said other windows, and means for feeding the portion of said strip at any of said windows forwardly or backwardly independently of other portions of the strip at the other windows.

7. Apparatus as claimed in claim 6 in which said projecting means includes means for projecting the images of two pictures drawn on said film strip at any two of said windows onto the film strip in superposed relation at a third window.

8. Apparatus as claimed in claim 6 in which the windows in said row are spaced apart at least one frame length, and in which said table is provided with a slot between each pair of adjacent windows to receive a loop of said film strip.

9. Apparatus as claimed in claim 6 in which said projecting means includes a light source adapted to direct a beam of light through one of said windows, and optical means for splitting said beam to direct one portion through a second window and to direct another portion through a third window.

10. Apparatus for making animated cartoons comprising, a drawing table, a plurality of windows in said table aligned in a row, means for mounting a film strip to extend across all of the windows in a row, another window in said table offset from said aligned windows, means for mounting a second film strip to extend across said last named window in a direction parallel to said first strip, means for projecting the image of a picture drawn on one of said film strips at one of said windows onto said film strip at any of said other windows, and means for feeding the portion of said film strips at any of said windows forwardly or backwardly independently of the other portions of the strips at the other windows.

11. Apparatus as claimed in claim 10 in which said windows which are aligned in a row are spaced apart at least one frame length, and in which said table is provided with a slot between each pair of adjacent windows to receive a loop of said film strip.

12. Apparatus as claimed in claim 10 in which said projecting means includes a light source adapted to direct a beam of light through one of said windows, and optical means for splitting said beam to direct one portion of said beam through a second window, and to direct another portion of said beam through a third window.

References Cited

UNITED STATES PATENTS 3,271,097 9/1966 De Montremy et al. ___ 352—41
3,390,939 7/1968 Paracuellos _____ 352—50

NORTON ANSHER, Primary Examiner

R. L. MOSES, Assistant Examiner

U.S. Cl. X.R.

352—52, 87, 133